United States Patent
Bosisio

(12)
(10) Patent No.: US 6,195,716 B1
(45) Date of Patent: Feb. 27, 2001

(54) SYSTEM BUS INTERFACE CONTROLLING AT LEAST ONE SLAVE DEVICE BY EXCHANGING THREE CONTROL SIGNALS

(75) Inventor: Giuseppe Bosisio, Milan (IT)

(73) Assignee: Bull HN Information Systems Italia S.P.A., Milan (IT)

( * ) Notice: Subject to any disclaimer, the term of this patent is extended or adjusted under 35 U.S.C. 154(b) by 0 days.

(21) Appl. No.: 09/095,951

(22) Filed: Jun. 11, 1998

(30) Foreign Application Priority Data

Jun. 16, 1998 (IT) .................................................. 97830309

(51) Int. Cl.[7] .................................................. G06F 13/00
(52) U.S. Cl. .......................... 710/100; 712/208; 712/209; 710/107; 710/129
(58) Field of Search .................................... 712/200, 221, 712/225, 208, 209; 710/100, 107, 129

(56) References Cited

U.S. PATENT DOCUMENTS 4,858,116 * 8/1989 Gillett, Jr. et al. .................. 711/152
5,430,849 * 7/1995 Banks .................................... 710/128
5,649,209 * 7/1997 Umetsu et al. ....................... 710/266

FOREIGN PATENT DOCUMENTS 0 301 610 A2   2/1989  (EP) .
0 344 886 A1  12/1989  (EP) .
WO 88/08584  11/1988  (WO) .

* cited by examiner

*Primary Examiner*—Meng-Ai T. An
*Assistant Examiner*—Mackly Monestime
(74) *Attorney, Agent, or Firm*—Akin, Gump, Strauss, Hauer & Feld, L.L.P.

(57) ABSTRACT

A slave device, connected directly to a system bus, which system bus requests the execution of a complex communication protocol, is controlled by another device, connected to the system bus, which identifies the slave device as the target of a transaction on the system bus, executes the communication protocol and sends to the slave device through an auxiliary interface a first identification signal, a second signal for instructing execution of the transaction, and receives from the slave device, through the auxiliary interface, a transaction executed signal. In this way the interface logic of the slave device is reduced to the minimum since the slave device is not required to execute the communication protocol.

9 Claims, 3 Drawing Sheets

SYSTEM BUS INTERFACE CONTROLLING AT LEAST ONE SLAVE DEVICE BY EXCHANGING THREE CONTROL SIGNALS

TECHNICAL FIELD

The present invention relates to an interface bridge between system bus and local bus (and more generally to an interface device between system bus and a system unit), provided with a simplified auxiliary control interface for the direct connection to the system bus of one or more memory devices and more generally "slave" devices.

It also relates to the corresponding simplified control interface and the corresponding interface protocol.

BACKGROUND OF THE INVENTION

It is known that in modern data processing systems, to obtain high performance, use is made of an architecture with several symmetric processors interconnected via a high-performance system bus.

A conventional example of a system bus commonly adopted is that currently termed 6xxwhich is particularly geared to the interconnection of RISC microprocessors, such as for example the POWER PC microprocessors from the IBM company or the like.

In this architecture, so as always to obtain high performance and to reduce the loads connected to the system bus, the operating frequency of which can thereby be increased beyond 100 MHz, the various I/O peripheral components are not connected directly to the system bus but rather to one or more local buses, for example of the type known as PCI standing for Peripheral Component Interconnect (bus) which communicate with the system bus through a PCI bridge.

The communication protocols and timings used by the local buses differ from those used by the system bus and the function of the bridge is to make it possible to transfer information between the buses, in full compliance with the corresponding protocols and corresponding timings.

The architecture and the protocol used by modern system buses are particularly elaborate, essentially in order to allow accesses to the bus of the "split" type, in which the addressing phase is separated from and entirely independent of the phase for transferring the data which are read, so as to ensure the consistency of the information, which may be replicated in several fast memories or caches, by means of bus watching or snooping operations, and so as to guarantee the correctness of the information transferred.

For example the 6xxsystem bus is made up of two distinct buses for the addresses (64 wires, 48 of which are reserved for the transferring of addresses and the remainder for service information such as transaction attributes, parity check bits, transaction identifier (Tag), size and type of transfer) and for the data (158 wires, 128 of which are reserved for the transfer of 8/16 bytes of data and the remainder for service information, such as parity bits, valid-data, error, bus-occupied and transaction identification (Tag) signals).

The transactions on the data bus take place at deferred time relative to those on the address bus, and in case of read cycles may also be out of order.

The logic link is ensured by a transaction identifier associated with the addresses and with the data.

The communication protocol on the address bus is divided into three phases:

in the first phase the address and the corresponding service information are latched and a parity check is performed, in the second phase, the type of transaction is verified, the availability or otherwise is verified of the resources for executing the transaction, and the various units connected to the system bus generate state signals which, gathered by a collector entity, generally an arbitration unit, are then broadcast to all the units connected to the system bus.

The state signals can indicate parity error, the need for a retry, if the resources needed for executing the transaction are occupied, acknowledgement of the transaction as executable, nullity of the transaction because of non-identification of a destination device or target.

The final phase is that of consistency verification or consistency snooping in which all the devices connected to the system bus report their own response to a collector entity via response signals RESP OUT. The collector entity then rebroadcasts to the various units a collective response code RESP IN which, depending on the consistency protocol adopted, generally the protocol known by the acronym MESI (Modified, Exclusive, Shared, Invalid), may have a different meaning, one of which is that of RETRY, for requesting the repetition of the current transaction, which is not executed.

Obviously the communication protocol is preceded by an arbitration phase (which may temporally overlap the execution of a previous transaction for access to the address bus) in the course of which the units which intend to obtain access to the address bus send an access request ABREQ to an arbitration unit which responds with a signal ABGRANT sent to just one in turn of the requesting units, depending on appropriate priority criteria.

The mechanism for transferring data to the data bus is much simpler.

In the case of write operations, the requesting or master unit presents simultaneously with the request for access to the address bus, also a request DBREQ for access to the data bus and, having obtained access and verified that the data bus is free, need do nothing other than assert a data bus occupied signal DBBSY and place thereon the data to be written.

In the case of read operations, the destination or target unit, addressed with a read request via the address bus, need do nothing other than request access to the data bus, with the assertion of a signal DBREQ and having obtained access from the arbitration unit (which responds with a signal DBGRANT asserted) and verified that the data bus is free, as indicated by a signal DBBSY deasserted, does nothing other than take possession thereof with the assertion of the signal DBBSY and transfer the requested data in one go (single beat) or in burst mode to the data bus (the mode is defined by the requesting or master unit).

It is thus evident that each unit, even the simplest, directly connected to the system bus, must be provided with interface logic able to operate in accordance with the communication protocol imposed by the system bus, even in the event that the unit is of the slave type, i.e. not able to activate transactions on the system bus (more properly on the address bus since, obviously, the unit has to respond if interrogated in read mode) and devoid of caches, thereby rendering such logic particularly complex and expensive.

The bridge devices which make it possible to set up a communication between the system bus and one or more local buses, the latter possibly providing for very simple communication protocols, only partly solve this drawback.

Thus, in this case, even if the cost and circuit complexity of the interface logic to the system bus is to some extent shared between the various units, in general more than one, connected to the local bus, it is however offset by the fact that the access transactions, for reading the units connected to the local buses, are appreciably slowed, while in some cases speed of response is essential.

A typical case consists for example of a ROM memory (possibly of the rewriteable EEPROM type) intended for storing part of the operating system which manages the working of the various processors connected to the system bus and which has to be speedily accessible by the various processors.

SUMMARY OF THE INVENTION

It is an object of the present invention to overcome these drawbacks of the prior art.

The present invention provides an interface bridge between system bus and one or more local buses, which is provided with a simplified auxiliary interface for controlling one or more "slave" devices such as for example ROM memories, for their direct connection to the system bus.

More generally the interface bridge may consist of any interface device between system bus and a unit of the system, to which device, which is intrinsically furnished with the logic required for the control of the protocol of the address bus, is delegated the function of interfacing with the address bus also for (on behalf of) a second "slave" device (or more than one), such as a ROM connected directly to the system bus and controlled by the first interface device and provided with just the simplified logic required for access to the data bus of the system bus.

The control interface between first and second devices is extremely simple and consists of a smallish number of wires and signals (in the case of a single slave device just three wires for transferring three signals, DEV_DEC, DEV_ACK and DEV_EDT respectively).

In the event that the slave devices are more than one, the signal DEV_DEC (one for each slave) can be selectively sent, with point-to-point connection, to the various slave devices. In this case the number of wires required, still smallish, is 2+N, where N is the number of slave devices.

It is also possible, in the event of several slave devices, to substitute the signal DEV_DEC with an equivalent selection code, sent to all the slave devices and acknowledged by just one of them, in which case, still with 2+N auxiliary interface wires, it is possible to control $2^N-1$ devices.

The first signal (or code) advises the second slave device that it has been identified as the destination or target of a transaction (read or write).

The second signal advises the second device that the protocol for communication over the address bus has concluded positively and the requested transaction can actually be executed.

The third signal, sent by the second device to the interface logic of the first device as a response to the first two, advises that the transaction has concluded and that the second device is available for a new transaction.

BRIEF DESCRIPTION OF THE DRAWINGS

The characteristics and advantages of the present invention will be clear from the following description, given with reference to the appended drawings in which.

DETAILED DESCRIPTION OF THE PREFERRED EMBODIMENT

Figure 1:
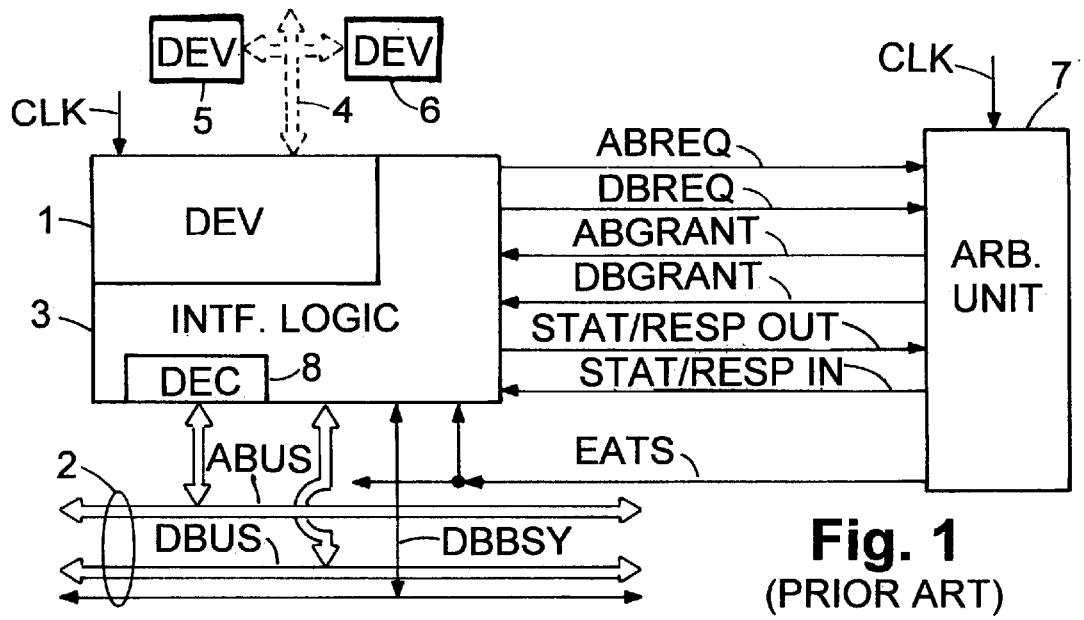
FIG. 1 is a block diagram of a device connected to a system bus, in particular an interface bridge, known in the art.

For a better understanding of the invention, FIG. 1 represents a block diagram of a generic device 1 connected directly to a system bus 2.

The device comprises interface logic 3 (INTF·LOGIC) which executes all of the necessary interface functions.

The device 1 can be a bridge for connecting the system bus 2 to a local bus 4, to which are connected peripheral units 5, 6 or even an I/O unit (data input/output) or even a processor.

In order to access the system bus the interface logic 3 is provided with wires for transferring to a unit 7 (ARB·UNIT) for arbitration of access to the system bus two signals ABREQ, DBREQ, respectively for requesting access to the address bus ABUS and to the data bus DBUS of the system bus.

The arbitration unit 7 allows access to the system bus, respectively to the address bus and/or to the data bus by means of two response signals ABGRANT and DBGRANT sent to the interface logic of the device 1.

In the course of the transactions over the address bus, however activated and observed by the unit 1, the interface logic executes the due control operations in compliance with the communication protocol, by sending to the arbitration unit 7 (or to a collector unit which may be different from the arbitration unit) state and response signals STAT/RESP OUT and receives collective state and response signals STAT/RESP IN from the same unit.

If the unit 1 acts as unit requesting the system bus, i.e. as master, the signals STAT/RESP IN may indicate address errors, or the need to reattempt access to the bus with a new request.

Conversely, if the unit 1 acts as destination unit or simply as observer of the transactions in progress on the system bus, the signals can have the effect of invalidating or modifying the state of cache locations, if the unit 1 is provided therewith, or of requesting the intervention of the unit 1 in substitution for another unit in the event that the observed transaction requests the reading of data possessed exclusively by the unit 1 (possibly with the need for the requesting unit to have to reattempt the operation, so as to allow the other units involved to execute the necessary consistency operations beforehand).

All the signals exchanged are timed by a system clock signal CLK, received by the unit 1 and by all the units connected to the system bus.

So as to acknowledge itself to be the destination of a transaction on the system bus, activated by another unit, the interface logic 3 comprises a decoder 8, preferably programmable (connected to the address bus via an input latch register 81 controlled by a signal EATS asserted by the arbitration unit 7 and having substantially the meaning of address validation signal) which makes it possible to recognize, among all the possible addresses on the address bus ABUS, those which identify the unit 1 as destination.

It should be noted that all the units connected to the system bus, if the latter is of the 6xxtype, have to be provided with an input latch register functionally equivalent to the register 81, for temporary storage of the address present on the system bus.

When the unit 1 is to transfer data to the data channel DBUS, once access to the data bus has been obtained (signal DBGRANT asserted) verifies that the data bus is actually free, as indicated by a signal DBBSY deasserted, asserts the signal DBBSY and keeps it asserted for the entire time required for data transfer.

All of these aspects come within the known art and do not require a more detailed description.

It is evident that the interface logic 3 is particularly complex, whatever the nature of the device 1, since it is imposed essentially by the communication protocol of the address bus.

In the event that the device 1 is a slave device, i.e. a device which acts only in response to external requests, the major part of the interface logic is superfluous in respect of the functionality of the device, but necessary for compatibility with the communication protocol.

Figure 2:
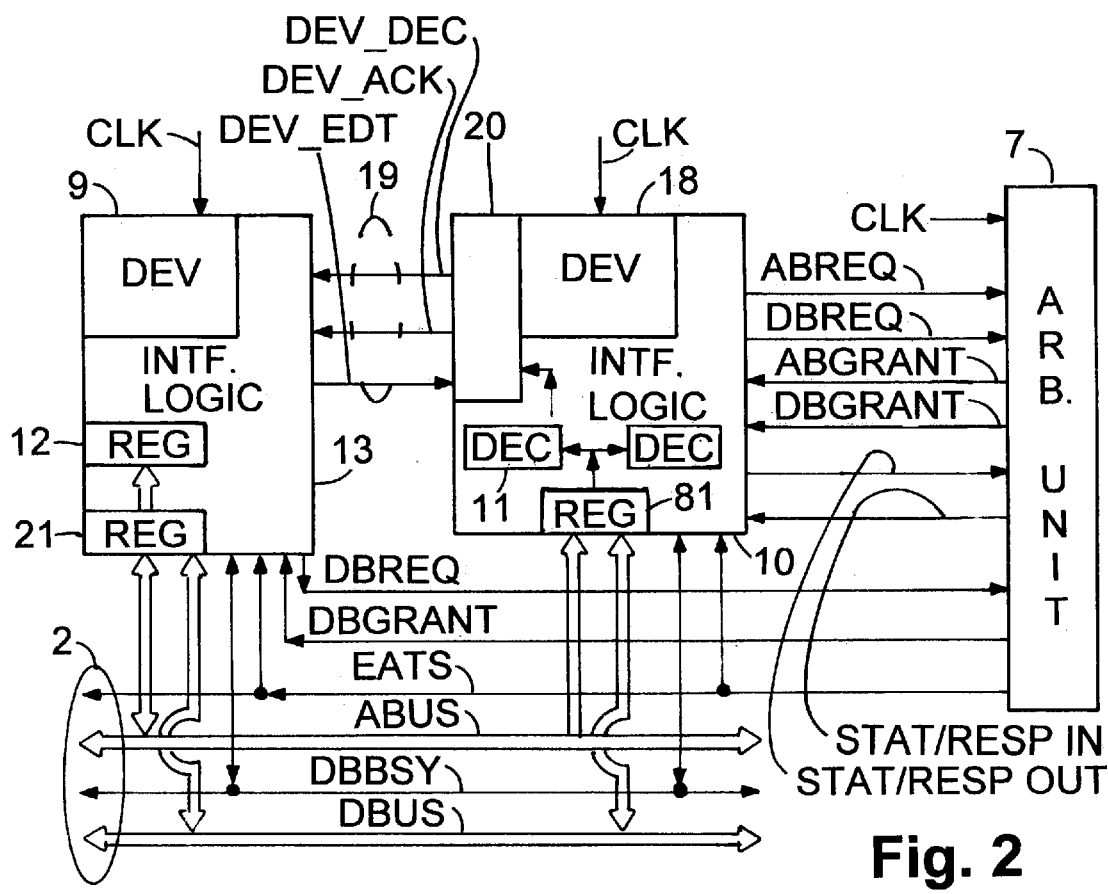
FIG. 2 is a block diagram of a first device, such as the device of FIG. 1, modified in accordance with the present invention and cooperating with a second device, connected directly to the system bus and controlled by the first through a simplified control interface.

FIG. 2 represents a system device 18 modified in accordance with the present invention, for allowing the direct connection to the system bus of a second slave device 9, without this second device being burdened by costs imposed by the interface circuit complexity for direct connection to the system bus.

The second device 9 can be regarded as an appendage to the device 18, by which it is controlled, via a three-wire auxiliary interface 19, and to which is delegated the entire function of interfacing with the address bus, reserving for itself the single task, when interrogated in read mode, of requesting access to the data bus and holding it occupied for the necessary time.

The interface logic 10 of the device 18 comprises, in addition to circuits and components known per se, functionally equivalent to the interface logic 3 of FIG. 1, a second decoder 11 which makes it possible to recognize among all the possible addresses present on the address bus ABUS, those which identify the second device 9 as destination and auxiliary interface logic 20 connected to the decoder 11.

Through the effect of this recognition the auxiliary logic 20 flags up to the device 9, on a wire of the interface 19, a signal DEV_DEC, subsequently confirmed on concluding the communication protocol of the address bus, if the signals STAT/RESP IN do not signal any error or the need for a RETRY, by the assertion of a second signal DEV_ACK to the device 9, on a second wire of the auxiliary interface 19.

Conversely the signal DEV_DEC is deasserted.

The device 9, on receiving the asserted signal DEV_DEC, transfers the address temporarily present on the system bus and previously loaded, under control of the signal EATS into an input buffer 21 equivalent to the buffer 81 into an input register 12 of its interface logic 13 (and any data associated with the address, in the case of a write operation, to a second data register or buffer) and, on receiving the asserted signal DEV_ACK, activates the execution of the requested operation.

If the operation requested is a read, this is executed and the data are loaded into an output register (not illustrated) and are associated with a transaction identifier TAG which is the copy of that associated with the address received.

The unit 9 then asserts an access request to the data bus DBREQ and having received the access permit signal DBGRANT and verified that the signal DBBSY is deasserted, occupies the data channel by asserting the signal DBBSY and places the data read on the bus together with the associated tag.

The data can be sent in bursts or in a block (single beat) depending on the operating mode specified by a field of bits associated with the address and stored in the input register.

Upon transfer executed, the signal DBBSY is deasserted.

Furthermore, in anticipation of its completion, with a predetermined advance, the unit 9 sends to the auxiliary interface logic 20 of the device 18, on a third wire of the auxiliary interface 19, an asserted signal DEV_EDT whose function is to reset or deassert the signals DEV_DEC and DEV_ACK by means of the interface logic 18.

The bursts of the various signals in the two devices 9 and 18 are timed by the clock signal CLK of the system bus.

If the requested operation is a write the unit 9 need merely transfer the data from the input buffer to the location specified by the address and confirm execution of the operation by deasserting the signal DEV_EDT.

Figure 3:
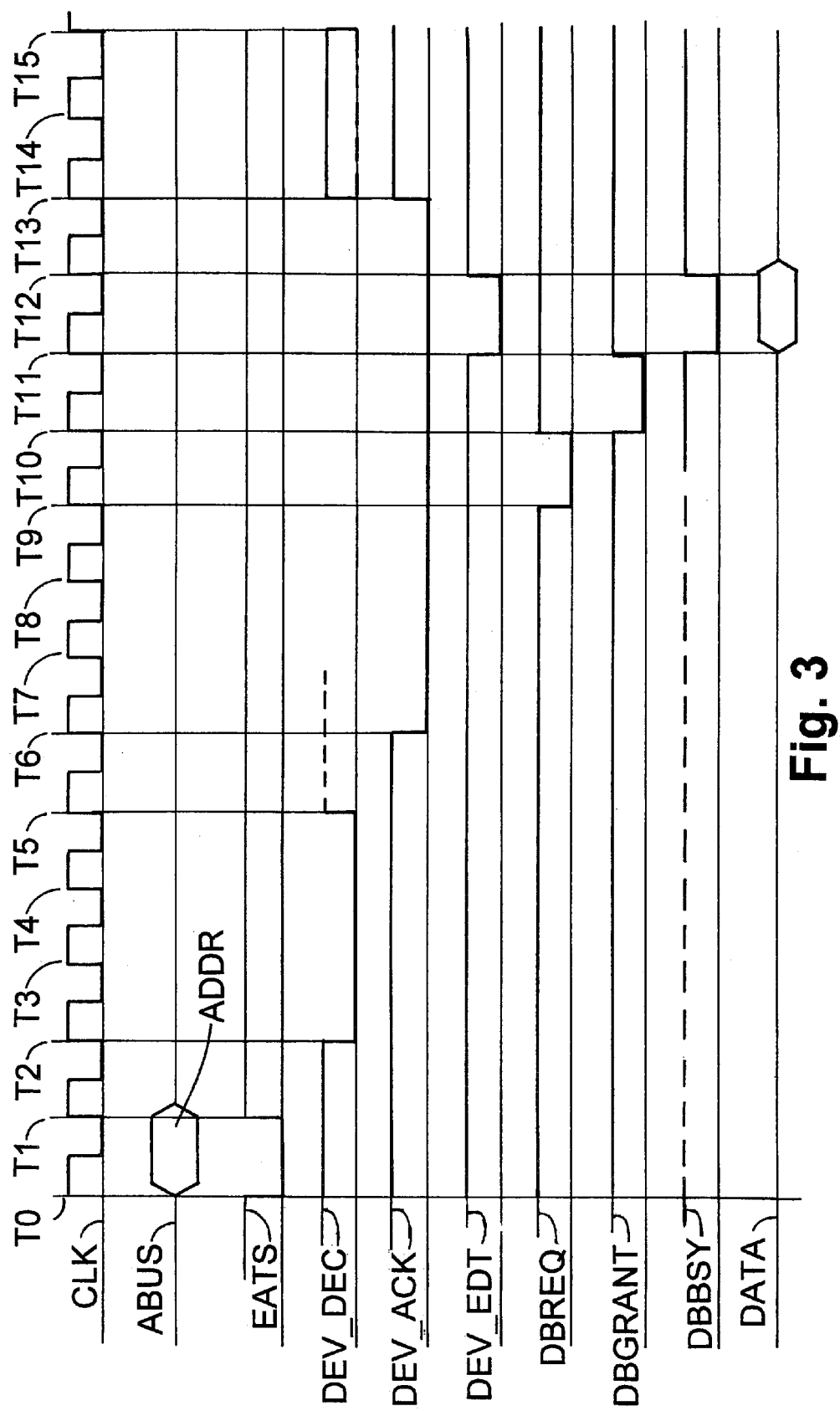
FIG. 3 is a time chart of some of the signals exchanged by the first and second devices in FIG. 2 with the system bus and with each other, through the simplified control interface.

FIG. 3 represents an illustrative timing diagram of the assertion/deassertion of the various signals in the case of read operations.

By convention a logically asserted signal is represented by a low level (electrically zero) of the signal.

At an initial instant T0, an address ADDR which is held, for example for a period of the clock signal CLK and is accompanied by a validation signal EATS asserted by the arbitration unit for a single period of the clock signal CLK, is placed on the address channel ABUS of the system bus.

The signal EATS stipulates that with its deassertion (instant T1) the address is removed from the system bus and that all the units connected to the system bus latch it in their input buffer (register 81 and 21, FIG. 2).

The decoder 11 (fig.2) acknowledges via the address ADDR, the device 9 as destination of the transaction and, at a subsequent instant T2, after a further period of the clock signal, the auxiliary interface logic 20 asserts the signal DEV_DEC.

This signal transfers the address already present on the system bus and the attributes associated therewith, previously loaded into the input buffer 21 (FIG. 2), into the interface register 12 of the device 9, downstream of the register 21.

The transaction specified by the address is however deferred until the conclusion of the protocol on the address channel of the system bus, executed by the interface logic 10 of the device 18, without any intervention by the device 9.

If in the course of the subsequent periods of the clock signal, which are defined for example by the instants T3, T4, T5 or more, (the number is in general programmable depending on requirements) the signals STAT/RESP IN supply an error or RETRY indication, the signal DEV_DEC is deasserted, at the latest, for example, at the instant T5.

If this does not happen, the auxiliary interface logic 20 asserts the signal DEV_ACK at the instant T6 following T5 and the specified transaction can be executed by the device 9.

In particular, in the event of a read, with the elapsing of a certain number of periods of the clock signal, which depends on the response time of the device 9, possibly reduced by the minimum time for arbitration of access to the data bus and for example at the instant T9, the device asserts the signal DBREQ for access to the data channel of the system bus and having gained access, for example at the instant T10, verifies that the signal DBBSY is deasserted (if it is asserted it is necessary to wait for the data channel of the system bus to be free) and if the condition is verified, asserts it (instant T11).

Having taken possession of the data channel, the unit 9 can begin the transfer of data with the modalities specified by the attributes associated with the address stored in the input register 12.

For example, if the data are to be transferred in a single beat together with the signal DBBSY there is asserted, to the device 18, the signal DEV_EDT and the data requested are placed on the data channel.

With the following clock pulse (instant T12) the signals DBBSY, DEV_EDT are deasserted and the data are removed from the bus.

With the detection of the deassertion of DEV_EDT, the auxiliary interface logic 20 of the device 18 deasserts (instant T13) the signals DEV_DEC and DEV_ACK.

Beneficially, a time-out mechanism is provided which ensures the deassertion of the signals DEV_DEC and DEV_ACK after a predetermined number of periods of the clock signal CLK, for example at the instant T15, in the event that the signal DEV_EDT is not asserted.

The auxiliary interface logic 20 and 13 of the two devices 18 and 9 may consist of simple state machines, whose structural description, having defined the interface functionality, is entirely superfluous.

It is sufficient in this respect to note that the auxiliary interface logic 20, regarded as a state machine, passes from an inactive state to an active state (generally followed by other active states) with the acknowledgement (by decoding an address placed on the system bus and loaded into the register 81) of the second device 9 as target of a transaction. The state transition is timed by the clock signal CLK and occurs at the instant T2.

In all of the active states of the state machine the signal DEV_DEC is asserted and becomes deasserted only when the state machine returns to the inactive state.

This occurs with the completion of the transaction, identified by the assertion and subsequent deassertion of the signal DEV_EDT, or else through a "time out" or else through the effect of a Retry signalling, generated or received by the interface logic 10.

Therefore in addition to the function of selection signal, the asserted signal DEV_DEC also has the function of indicating that the device 9 has been selected and is occupied, waiting to execute a requested transaction or in the phase of executing the latter.

This consideration is important for the following reason:

in the time period in which the state machine is active and DEV_DEC asserted it may happen that transaction requests which have the device 9 as target may be placed on the system bus, if several master units are connected to the bus.

These requests are detected by the device 18 but cannot be honoured because the device 9 is already occupied.

Evidently the auxiliary interface logic 20 interacts with the interface logic 10, for example specifically with the signal DEV_DEC.

The interface logic 10 can therefore correctly execute the address bus protocol, signalling with the signals STAT/RESP OUT that the target device 9 is already occupied and that the request for access to the system bus must be reattempted.

FIG. 2 refers to an embodiment in which a first device 18 controls just one second device 9.

It is however evident that other solutions are possible.

For example the first device can be designed to control, via several independent auxiliary interface logic modules and corresponding independent auxiliary interfaces, a plurality of other devices, which can thus be simultaneously active.

More simply, it is possible, with the same auxiliary interface structured as a multipoint connection bus and with the same auxiliary interface logic, to control several slave devices, one of which alone may however be active at any time.

Figure 4:
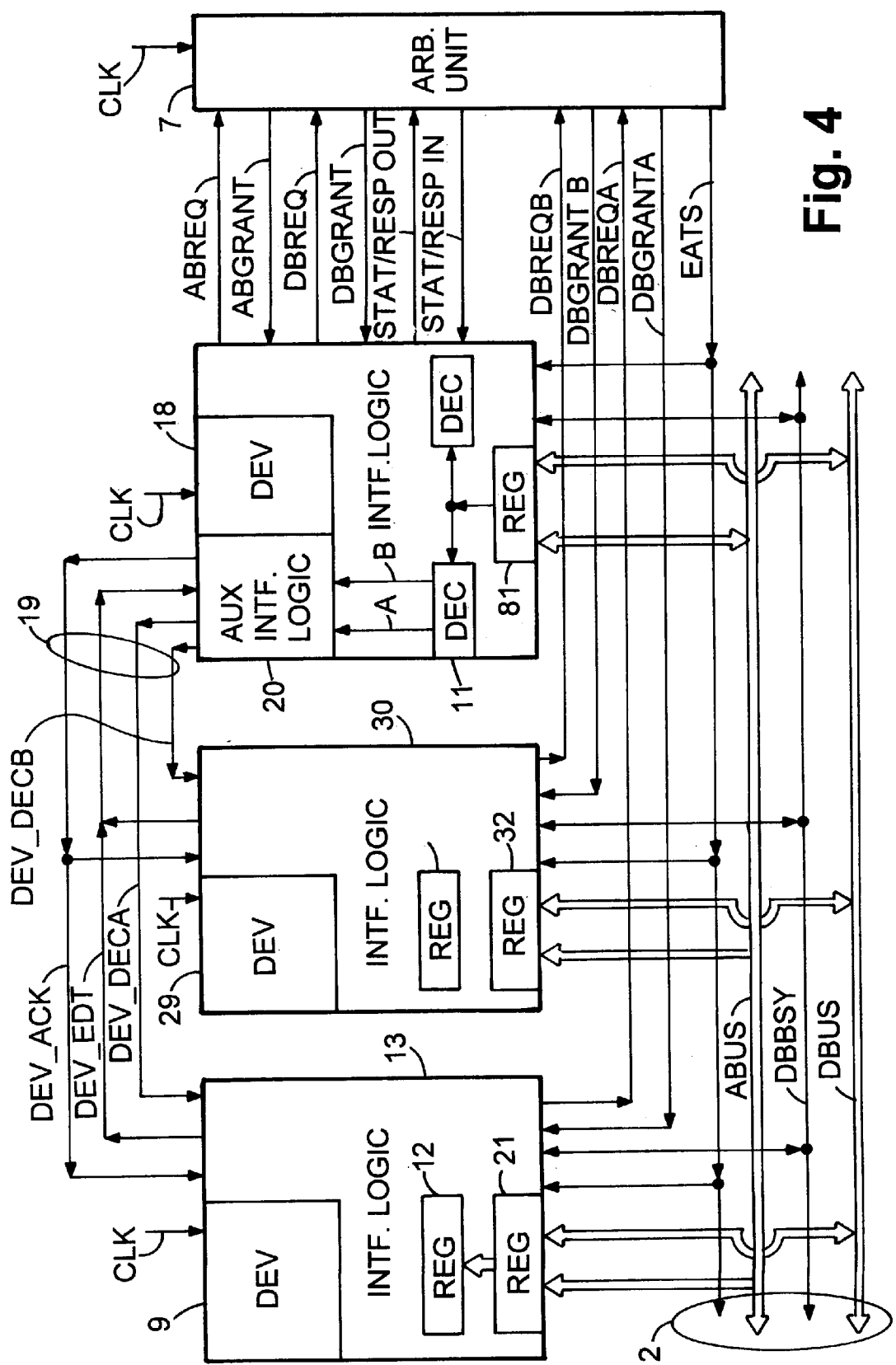
FIG. 4 is a block diagram of a first device, like the device in FIG. 1, modified in accordance with he present invention and cooperating with two devices, connected directly to the system bus and controlled by he first through a simplified control interface, in accordance with the present invention.

For greater clarity, FIG. 4 represents this embodiment, referred for simplicity to just two slave devices.

In FIG. 4, the same reference numerals as in FIG. 2 are used for one of the slave devices and for the control device, the devices of the two figures being substantially identical, both functionally and structurally.

The control device 18 is interconnected, as in the case of FIG. 2, with the system bus 3 and with an arbitration unit 7. As in the case of FIG. 2 it comprises an input register 81, an address decoder 11 and auxiliary interface logic 20, as well as obviously logic 10 for interfacing with the system bus.

The only difference relative to FIG. 2, is that the decoder 11 (which can be substituted by two separate decoders) is able to acknowledge two different addresses or address fields as the destination addresses of two separate target devices A and B.

It therefore supplies the auxiliary interface logic with two separate signals A and B, asserted in a mutually exclusive manner, for selecting one or the other device.

In this case, the auxiliary interface logic 20 drives, depending on the signals, A and B, two separate signals DEV_DECA and DEV_DECB on two separate and similarly named output wires, connected respectively to a first slave device 9 and to a second slave device 29.

The slave device 9 is identical to the similarly named device of FIG. 2 and is interconnected to the device 18 through the auxiliary interface 19 and to the other units of the system through the system bus 2.

Its interface logic 13 comprises two cascaded input registers 21, 12, as in the case of FIG. 2. Access to the data channel of the system bus is managed via the arbitration protocol already seen, with the signals DBREQA, DBGRANTA and DBSY.

Activation of the device 9 is controlled by the asserted signal DEV_DECA.

The slave device 29 is identical to the device 9: this too is provided with interface logic 30, comprises two cascaded input registers 31, 32 and is interconnected to the device 18 via the auxiliary interface 19 and to the other units of the system via the system bus 2.

Access to the data channel of the system bus is managed via the arbitration protocol already seen, with the signals DBREQB, DBGRANTB and DBBSY.

Activation of the device 29 is controlled by the asserted signal DEV_DECB.

The auxiliary interface 19 comprises a wire for transferring, from the auxiliary interface logic 20 to the devices 9 and 29, a single signal DEC_ACK which is meaningful only in respect of that device, out of the devices 9 and 29, which has been activated.

Similarly, with a single wire, the signal DEV_EDT is transferred, driven by one or the other of the devices 9 and 29, to the auxiliary interface logic 20, this signal, when asserted, indicating that the currently activated unit (the identity of which is known to the logic module 20, it having asserted the signal DEV_DECA or DEV_DECB in a mutually exclusively manner) has completed its task.

It is therefore possible, with a single auxiliary interface 19, which in this case assumes the structure of a multipoint bus (except for the transfer of the signal DEV_DEC which is selective) and with a single control device 18, provided with a single auxiliary interface logic module 20, to control more than one slave device (two in the example) to which is left the single task, just in the case of read operations, of executing the simple protocol for access to the data channel of the system bus.

It is clear that with this architecture just one in turn of the slave devices connected to the auxiliary interface may be selected and activated.

This fact does not constitute a substantial limitation if the slave devices thus controlled are infrequently used devices for which the probability of simultaneous access is low.

It is appropriate to stress at this juncture that no limitation, either on account of this last embodiment or on account of those previously described or mentioned, is imposed on the stand-alone operation of the control device 18, which may operate as master or as bridge under complete time overlap with the activity of the slave device or devices controlled thereby.

It is then clear that the signal DEV_DEC, selectively sent to each of the slave devices, can be substituted by a selection code transferred over several wires to all the slave devices.

For example, a 3-bit code, which may have 8 configurations, makes it possible to select up to 7 devices, one of the configurations obviously being reserved to indicate that the code is unflagged.

A prerequisite of this solution is that the device 18 and the slave devices be of synchronous type, timed by the same clock signal so as to ensure that the acknowledgement of the selection code is performed when the code is permanently present.

In the event that the devices are of asynchronous type an approach of this type is still possible using a common signal DEV_DEC, sent to all the devices with a single multipoint wire, accompanied by an identification code, transferred on other multipoint wires, and permanently present when the signal DEV_DEC is asserted and validates the code.

For example with just four wires it is possible in this case to select up to 8 units.

In conclusion the system described refers to the combined use of at least two devices 18, 9 connected directly to a system bus, and intercommunicating with one another via a simplified auxiliary interface 19, the first device 18 being provided with interface logic 10 for managing the entire protocol of the communication with the system bus, including the protocol for communication with the address bus, and with means (decoder 11 and auxiliary interface logic 20) for acknowledging the second device (of one among several devices) as the destination unit of a transaction on the system bus, as identified by an address, the second device 9 being provided with very simple interface logic 13 for managing just the protocol for communication with the data bus of the system bus.

The two devices interact by means of an interface 19 consisting of just three wires for exchanging three signals DEV_DEC, DEV_ACK, DEV_EDT according to an extremely simple protocol.

The signal DEV_DEC may possibly be substituted by a selection code transferred via a plurality of wires.

Therefore, the innovative aspects of the present invention can be identified from various standpoints:

in the combination of the two devices (at least) interconnected to a system bus and cooperating with one another as described, in a first device, with interface for interconnection to a system bus and provided with an auxiliary interface for controlling at least one second device, in a second device for direct interconnection to a system bus and provided with interface logic to the system bus for managing just the protocol for communication with the data bus of the system bus, and provided also with an interface with an external control device, in a simplified interface with just three signals (one of which may consist of a binary selection code) which allows the control of at least one second device by a first device, for the direct connection of the second device to a system bus.

What is claimed is:

1. A device for a data processing system, said device being provided with interface logic for connection to a system bus and for the execution of a communication protocol of an address bus of said system bus, wherein said device comprises:

an address field decoder for acknowledging at least one other device, connected to said system bus as the target of a transaction on said system bus and an auxiliary interface and corresponding auxiliary interface logic for exchanging with said at least one other device three control signals, a first signal of which is asserted by said interface logic when said at least one other device is acknowledged by said decoder as the target of a transaction on said system bus, a second signal of which is asserted by said interface logic upon the completion of said communication protocol, only if as a result of the completion of said communication protocol said transaction is to be executed, and a third signal of which is asserted and deasserted by said at least one other device in order to confirm that the requested transaction is undergoing completion and that said first and second signals can be deasserted, said first signal being deasserted by said interface logic if as a result of the execution of said communication protocol said transaction is not to be executed.

2. The device according to claim 1, in which said device is a bridge for interconnection of said system bus with at least one local bus.

3. A slave device for direct connection to a system bus, said system bus comprising an address bus and a data bus, a transaction on said system bus being managed with a first communication protocol of said address bus and a second communication protocol of said data bus, wherein said slave device comprises:

interface logic for connection to said system bus and the execution of exclusivity said second communication protocol with said data bus, and an auxiliary interface for exchanging with a second device connected to said system bus, three control signals, a first signal of which is asserted by said second device, in order to signal that said slave device is the target of a transaction on said system bus, a second signal of which is asserted by said second device in order to signal, upon completion of the first communication protocol with said address bus, executed by said second device, that said slave device identified as the target is to execute said transaction, and a third signal of which is asserted and deasserted by said slave device, in order to signal that the execution of said transaction is undergoing completion and that said first and second signals are to be deasserted.

4. The slave device according to claim 3 in which said slave device is a read-only memory.

5. A control interface for the control of at least one slave device, directly connected to a system bus and devoid of logic for the execution of a communication protocol of an address bus of said system bus, on the part of a second device, connected to said system bus and provided with interface logic for the execution of said protocol and with means for acknowledging said slave device as the target of a transaction on said system bus, wherein said control interface comprises:

at least one first lead for transferring from said second device to said at least one slave device a first signal or code indicative, when asserted, that said at least one slave device is the target of a transaction on said system bus a second lead for transferring from said second device to said at least one slave device, a second signal indicative, when asserted, that said communication protocol has been completed successfully by said interface logic and that said transaction is to be executed by said at least one slave device, and a third lead for transferring, from said at least one slave device to said second device, an asserted signal pulse indicative that said transaction is undergoing completion and that said first and second signals can be deasserted, said first signal being deasserted if as a result of the execution of said communication protocol said transaction is not to be executed.

6. A data processing system comprising a system bus, a first device, connected to said system bus and provided with interface logic for the execution of a communication protocol of said system bus, and at least one second slave device, connected to said system bus, wherein said first device comprises an address field decoder for acknowledging said at least one second slave device as the target of a transaction on said system bus, and said first device and said at least one second slave device are interconnected by an auxiliary control interface, though which said first device sends to said at least one second slave device a first signal, asserted to indicate that said at least one second slave device has been identified as the target of a transaction on said system bus, a second signal asserted to indicate that as a result of the execution of said communication protocol said transaction is to be executed by said at least one second slave device, and through which interface said at least one second slave device sends to said first device a third signal asserted for a predetermined time, to indicate that said transaction is undergoing completion and that said first and second signals can be unflagged.

7. The data processing system according to claim 6 in which said first device is a bridge for interconnection of said system bus with a local bus and said at least one second slave device is a read-only memory.

8. The slave device according to claim 4 wherein the read-only memory is programmable.

9. The data processing system according to claim 7 wherein the read-only memory is programmable.

* * * * *